March 23, 1937.  J. F. GORDON  2,074,388
GASKET
Filed June 28, 1934
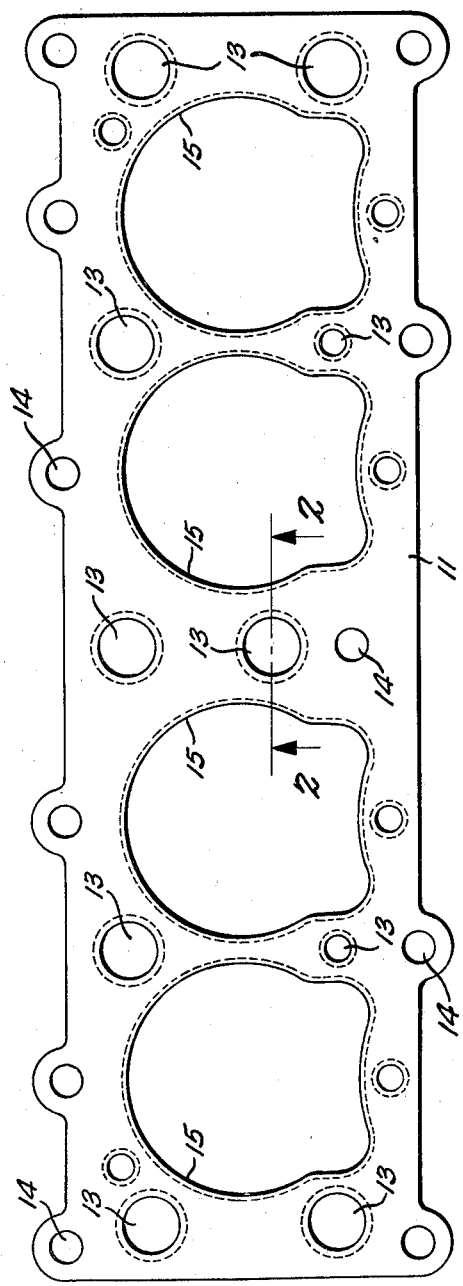
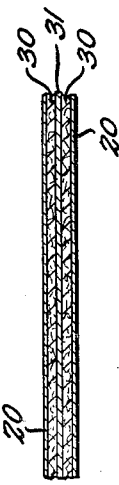
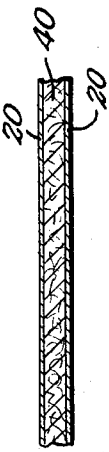
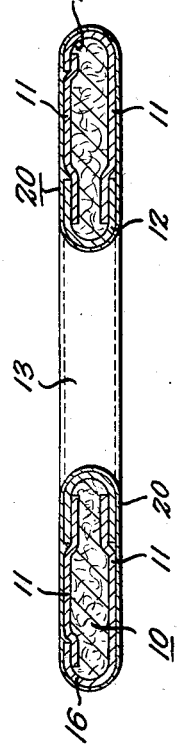
INVENTOR
John F. Gordon
BY
Spencer Hardman & Fehr
his ATTORNEYS Patented Mar. 23, 1937

2,074,388

UNITED STATES PATENT OFFICE 2,074,388

GASKET

John F. Gordon, Detroit, Mich., assignor to General Motors Corporation, Detroit, Mich., a corporation of Delaware Application June 28, 1934, Serial No. 732,761

4 Claims. (Cl. 288—1)

This invention relates to sealing gaskets adapted to be clamped between two adjoining parts, such as between the cylinder block and cylinder head of automobile engines, and the like.

Ordinarily such cylinder head gaskets comprise a compressible asbestos fiber sheet. In some types this asbestos sheet is reinforced by an interior reinforcement of sheet steel or other metal, and in other types the asbestos sheet lies between two outer layers of flexible sheet copper or other metal.

In the types where the surface of the asbestos sheet directly contacts the cylinder head or cylinder block in use, a leak-proof seal is ordinarily provided but difficulties arise when it is necessary to remove and replace the cylinder head for any reason. In such cases the asbestos sheet usually sticks so tightly to either one or both of the metal surfaces between which it has been tightly clamped that it is very difficult to remove and parts thereof have to be carefully scraped by hand from the metal surfaces in small particles. Such operation of course materially increases labor costs and the gasket itself cannot be reused.

In the known types of gasket where the compressible asbestos sheet does not directly contact the joined surfaces but the outer relatively thin and flexible sheet metal layers directly contact the cylinder head and cylinder block it is very difficult to insure that a leak-proof seal has been provided, especially across the relatively narrow joint between two adjacent cylinders where leakage from cylinder to cylinder often occurs due to a high compression in one cylinder while a low pressure or partial vacuum exists in the adjacent cylinder. This "seepage" is due primarily to the fact that metal against metal does not and cannot provide a good seal against escape of gases at high differential pressures. Also the difficulty of sticking gaskets is not entirely eliminated by the use of the outer flexible metal layers, as even in these types the gasket is usually so marred, torn or bent during efforts to remove it from the cylinder block or cylinder head that it cannot be reused.

Now the object of this invention is to provide a surface treatment for gaskets of any type which will overcome the above described difficulties, which will provide a more perfect seal between the cylinder head and cylinder block of automobile engines, and the like, than that provided by present gaskets, and which will greatly facilitate the removal of the gasket by substantially preventing the sticking of the gasket to either the cylinder block or cylinder head, or to any other surface against which it may be clamped.

Another object is to provide a surface treatment for any gasket having an exterior asbestos surface which will add materially to the strength and durability of the asbestos layer, provide a better sealed joint between the asbestos layer and the metal surface against which it is clamped, and prevent sticking of the asbestos layer to the metal surface whereby to facilitate its removal and permit its reuse.

Further objects and advantages of the present invention will be apparent from the following description, reference being had to the accompanying drawing, wherein a preferred embodiment of the present invention is clearly shown.

In the drawing:

Fig. 1 is a plan view of an automobile cylinder head gasket of a known type, but having an exterior non-metallic coating according to this invention.

Fig. 2 is a section on line 2—2 of Fig. 1 on a magnified scale.

Fig. 3 shows a fragmentary section on a magnified scale of another form of gasket having an interior reinforcement of sheet metal and asbestos fiber layers on each side thereof, and the outer surfaces of asbestos layers coated according to this invention.

Fig. 4 shows a fragmentary section through a third form of gasket comprising a simple asbestos fiber body reinforced on its exposed surfaces with the coatings of this invention.

Similar reference characters refer to similar parts throughout the several views.

Fig. 1 shows a cylinder head gasket having an interior compressible asbestos fiber body 10 sandwiched between two flexible thin sheet copper outer layers 11. Preferably a circular thin metal grommet 12 closes off the raw edges of the asbestos body 10 at the various water circulation openings 13 or other openings therein other than the bolt holes 14. Also preferably the raw edges of the asbestos body is closed around the combustion chamber openings 15 by curling over the edge of one copper layer 11 upon the other copper layer, as shown at 16 in Fig. 2. The flanges of grommets 12 and curled edges 16 are countersunk in the copper layers 11 to be flush therewith, substantially as shown in Fig. 2. The gasket thus formed is ordinarily clamped tightly between the cylinder block and cylinder head of an internal combustion engine.

Now according to this invention the above described gasket is provided with a strongly adhering outer coating 20 comprising pyroxylin and graphite which performs the following functions: (1) it provides a much better sealing surface than the thin copper sheet 11 and does not require such high clamping pressure; (2) it remains perfectly dry and does not bond to the metal surfaces of the cylinder block or head and hence the gasket can be easily removed without marring the gasket, with the advantages described above; (3) it fills in any small recesses such as occur around the periphery of the flanges of grommets 12 and also provides a strengthening and protective coating against marring of a new gasket from the time the gasket is made until it is assembled in place by the mechanic.

In the form of gasket shown in Fig. 3, two outer asbestos fiber layers 30 embed a reinforcing steel sheet 31. This gasket may be made in the plan form of Fig. 1, or in any other desired form. In this form the exterior pyroxylin and graphite coating 20 obviously provides the above described three important functions.

In the form of gasket shown in Fig. 4, the asbestos fiber or other suitable fibrous body 40 is completely encased in the exterior pyroxylin and graphite coating 20. Here again coating 20 provides the above described three important functions. In this form the protective and strengthening features of coating 20 are very advantageous since this form has no metal reinforcement.

The coating 20 of this invention is preferably made as follows. Cellulose nitrate, preferably having a viscosity of about 80 seconds (when determined by the 1931 Tentative Specification D—301 of the American Society for Testing Materials), and a small percentage of camphor are dissolved in a suitable solvent therefor, such as acetone, and the desired amount of very finely divided amorphous graphite added thereto to provide a liquid mixture sufficiently fluent to be properly applied to the gaskets either by dipping the gaskets in the liquid, by spray coating, or by brush coating the gaskets with the liquid mixture. Upon evaporation of the solvent in the wet coating there remains the solid coating of cellulose nitrate and camphor and the fine amorphous graphite distributed homogeneously therethrough.

The following formula is given as a specific example for providing a dip coating on cylinder head gaskets for automobile engines:

| | Parts by weight |
|---|---|
| Cellulose nitrate (80 seconds viscosity) | 2.33 |
| Camphor | .33 |
| Finely divided amorphous graphite | 4.67 |
| Acetone | 91.67 |
| Butyl lactate | 1.00 |
| | 100.00 |

The camphor serves as a flexibilizing agent for the cellulose nitrate and hence the degree of flexibility of the coating 20 may be varied as desired by varying the amount of camphor in the formula. Butyl lactate is a solvent for cellulose nitrate which is less volatile and hence slower drying than acetone, hence the amount of butyl lactate in the formula may be made such as will give the desired rapidity of drying of the applied coating 20 in any particular case.

The proportion of cellulose nitrate to amorphous graphite may vary considerably according to the use to which the gasket is put, from 1 to 2 as given in above formula to 1 to 5. The finely divided amorphous graphite serves to prevent the cellulose nitrate from burning and it is thought also serves to prevent the gasket from sticking to the cylinder head or block, or to other surfaces against which it may be clamped tightly for long periods of use.

While the embodiment of the present invention as herein disclosed, constitutes a preferred form, it is to be understood that other forms might be adopted, all coming within the scope of the claims which follow.

What is claimed is as follows:

1. A sealing gasket of the type adapted to be clamped between the cylinder block and cylinder head of an internal combustion engine and comprising a resilient fibrous layer and outer thin sheet metal layers substantially covering and permanently fixed to said fibrous layer and forming a unitary complete gasket, said gasket having an additional dry non-metallic seal coating applied upon and permanently adhering to the exposed surfaces of said sheet metal layers, said seal coating comprising pyroxylin and finely divided graphite in the proportion of 1 part of pyroxylin to 2 to 5 parts of graphite.

2. A sealing gasket of the type adapted to be clamped between two heated metal surfaces and having a fibrous non-metallic layer exposed upon one of its clamping surfaces, said exposed fibrous layer having an outer dry non-metallic seal coating applied upon and permanently adhering thereto, said seal coating comprising pyroxylin and finely divided graphite and forming a slightly resilient seal-enhancing and gasket-removal-facilitating layer, the proportion of pyroxylin to graphite being 1 part pyroxylin to 2 to 5 parts graphite.

3. A sealing gasket adapted to be clamped tightly between hot metal surfaces and having on its clamping surfaces a strongly adhering layer comprising a binder of cellulose nitrate and camphor compounded with finely divided amorphous graphite in the ratio of from 2 to 5 parts amorphous graphite to 1 part cellulose nitrate.

4. A sealing gasket adapted to be clamped tightly between hot metal surfaces and having on its clamping surfaces an adhering heat-resisting layer comprising pyroxylin compounded with finely divided graphite in the ratio of from 2 to 5 parts graphite to 1 part pyroxylin.

JOHN F. GORDON.